(12) United States Patent
Lee et al.

(10) Patent No.: US 7,075,988 B2
(45) Date of Patent: *Jul. 11, 2006

(54) APPARATUS AND METHOD OF CONVERTING FRAME AND/OR FIELD RATE USING ADAPTIVE MOTION COMPENSATION

(75) Inventors: Sung-hee Lee, Gyeonggi-do (KR); Seung-joon Yang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 693 days.

This patent is subject to a terminal disclaimer.

(21) Appl. No.: 10/277,093

(22) Filed: Oct. 22, 2002

(65) Prior Publication Data

US 2003/0086498 A1 May 8, 2003

(30) Foreign Application Priority Data

Oct. 25, 2001 (KR) ............... 2001-66014

(51) Int. Cl.
*H04N 7/112* (2006.01)
*G06K 9/36* (2006.01)

(52) U.S. Cl. ............... 375/240.16; 382/236
(58) Field of Classification Search ........... 375/240.16, 375/240.29, 240.24, 240.02, 240.12; 348/429.1, 348/699, 700; 382/236, 238, 107
See application file for complete search history.

(56) References Cited

U.S. PATENT DOCUMENTS

| | | | | |
|---|---|---|---|---|
| 4,890,160 A | * | 12/1989 | Thomas | 348/429.1 |
| 5,889,890 A | * | 3/1999 | Heimburger | 382/236 |
| 6,252,975 B1 | * | 6/2001 | Bozdagi et al. | 382/107 |
| 6,385,245 B1 | * | 5/2002 | De Haan et al. | 375/240.16 |
| 6,532,264 B1 | * | 3/2003 | Kahn | 375/240.16 |
| 6,580,812 B1 | * | 6/2003 | Harrington | 382/107 |

FOREIGN PATENT DOCUMENTS

| | | |
|---|---|---|
| EP | 0 414 113 A2 | 8/1990 |
| JP | 05-068239 | 3/1993 |
| JP | 06-296264 | 10/1994 |
| JP | 2001-054075 | 2/2001 |
| WO | 01/74082 | 10/2001 |

(Continued)

OTHER PUBLICATIONS

Ojo O A, et al. "Robust Motion-Compensated Video Upconversion," *IEEE Transactions on Consumer Electronics*, IEEE Inc. New York, US, vol. 43, No. 4, Nov. 1, 1997 (pp. 1045-1056).

(Continued)

*Primary Examiner*—Gims Philippe
(74) *Attorney, Agent, or Firm*—Staas & Halsey LLP

(57) ABSTRACT

An apparatus and method which includes estimating a motion vector of a frame and/or field to be interpolated and the accuracy of the motion vector using motion vectors of previous and next frames and/or fields; determining motion information by analyzing the estimated motion vector, and calculating a correlation between the motion vector of the current block and the motion vectors of neighboring blocks; generating pixels to be interpolated by performing motion compensation in a frame and/or field to be interpolated using the estimated motion vector and using pixels neighboring a pixel to be interpolated in the frame and/or field to be interpolated and pixels neighboring a pixel to be interpolated in the previous and next frame and/or field of the pixel to be interpolated; and outputting the generated pixels as interpolation values according to the accuracy of the estimated motion vector, the motion information, and the correlation.

33 Claims, 4 Drawing Sheets

FOREIGN PATENT DOCUMENTS

| | | |
|---|---|---|
| JP | 06-326975 | 11/1994 |
| JP | 10-023374 | 1/1998 |
| JP | 2001-024988 | 1/2001 |

OTHER PUBLICATIONS

Hahn M, et al. "Hardware Implementation of a Motion-Compensating Format Converter," *Journal of Electronic Imaging, SPIE + IS&T, US*, vol. 4, No. 3, Jul. 1, 1995 (pp. 270-277).

Tourapis A M, et al. "Temporal Interpolation of Video Sequences Using Zonal Based Algorithms," *Proceedings 2001 International Conference on Image Processing. ICIP 2001.* Thessaloniki, Greece, Oct. 7-10, 2001, *International Conference on Image Processing*, New York, NY: *IEEE, US*, vol. 1 of 3. Conf. 8, Oct. 7, 2001 (pp. 895-898).

Office Action dated Sep. 9, 2005 of the copending Chinese Patent Application No. 02145841.3.

* cited by examiner

APPARATUS AND METHOD OF CONVERTING FRAME AND/OR FIELD RATE USING ADAPTIVE MOTION COMPENSATION

CROSS-REFERENCE TO RELATED APPLICATION

This application claims the benefit of Korean Application No. 2001-66014, filed Oct. 25, 2001 in the Korean Intellectual Property Office, the disclosure of which is incorporated herein by reference.

BACKGROUND OF THE INVENTION

1. Field of the Invention

The present invention relates to an apparatus and method of converting the format of an image signal, and more particularly, to an apparatus and method of converting a frame and/or field rate using different motion compensation methods according to motion information of each block of the frame/field.

2. Description of the Related Art

In general, in order to exchange TV programs complying with a variety of TV standards, a format conversion of the programs is needed. In the early stage of TV format conversion, the format conversion was performed using a repetition of a frame and a simple spatiotemporal filter, which caused visually annoying motion jitter and blurring at the edges of an image. In particular, when screen resolution is higher as in a high definition television (i.e. an HDTV), these phenomena are very significant. Recently, in order to remove the phenomena, frame conversion methods using motion compensation have been developed.

FIG. 1 is a conceptual diagram showing a method of converting a frame rate using a conventional compensation method. Referring to FIG. 1, a frame $F_i(\vec{x}, n-\frac{1}{2})$ to be interpolated is defined using a 3-tap median filtering as in the following equation 1:

$$F_i\left(\vec{x}, n - \frac{1'}{2}\right) = MEDIAN(mcl, av, mcr) \quad (1)$$

Here, data obtained from two neighboring frames (n−1, n) considering motion traces are "mcl" and "mcr," data obtained by linear interpolation of the two frames is "av". These data can be expressed as follows.

$$mcl = F(\vec{x} - \alpha\vec{D}(\vec{x}, n), n - 1)$$
$$mcr = F(\vec{x} - (1 - \alpha)\vec{D}(\vec{x}, n), n)$$
$$av = \frac{1}{2}(F(\vec{x}, n) + F(\vec{x}, n - 1)) \quad (2)$$

Here, α is determined by the time at which a frame to be interpolated from the two frames will be located, and $\vec{D}$ is a motion vector.

If the motion vector $\vec{D}$ is accurately estimated in Equation 2, the motion compensation data have the values of "mcl" and "mcr," and the values are determined as the pixel to be interpolated. Presently, however, if the motion vector $\vec{D}$ is not accurate, the motion compensation data have different values, and therefore it is highly probable to determine "av" data that do not consider motions as pixel to be interpolated. Since the conventional compensation-type interpolation method is performed in units of a frame/field block, if the estimated motion vector $\vec{D}$ is not accurate, block artifacts occur.

SUMMARY OF THE INVENTION

To solve the above and other problems, it is an object of the present invention to provide a method of converting a frame and/or field rate of an image signal which reduces frame/field block artifacts by applying different compensation methods according to motion information classified by block, and by performing soft-switching between an interpolation value by motion compensation and a linear interpolation value, using a correlation between the motion vector of a current block and the motion vectors of neighboring blocks.

It is another object of the present invention to provide an apparatus to convert a frame and/or field rate of an image signal, which performs the above method.

Additional objects and advantages of the invention will be set forth in part in the description which follows and, in part, will be obvious from the description, or may be learned by practice of the invention.

To accomplish the above and other objects of the present invention, there is provided a method of converting a frame and/or field rate of an input image signal according to an embodiment of the invention in which a motion vector of a frame and/or field to be interpolated and the accuracy of the motion vector are estimated using motion vectors of previous and next frames and/or fields, motion information is determined by analyzing the estimated motion vector while calculating a correlation between the motion vector of the current block and the motion vectors of neighboring blocks, pixels to be interpolated are generated by performing motion compensation in the frame and/or field to be interpolated using the estimated motion vector, pixels to be interpolated are generated using pixels neighboring a pixel to be interpolated in the frame and/or field to be interpolated and pixels neighboring a pixel to be interpolated in the previous and next frame and/or field of the pixel to be interpolated, and the generated pixels are output as interpolation values according to the accuracy of the estimated motion vector, the determined motion information, and the calculated correlation.

According to another embodiment of the invention, an apparatus converts a frame and/or field rate of an image signal and includes a motion estimation unit, a motion analyzing unit, a motion compensation interpolation unit, a spatiotemporal interpolation unit, and an adaptive motion compensation unit, where the motion estimation unit estimates a motion vector for a frame and/or field to be interpolated using motion vectors of previous and next frames and/or fields, the motion analyzing unit determines motion information by analyzing the motion vector estimated in the motion estimation unit, and calculates a correlation between the motion vector of the current block and the motion vector of neighboring blocks, the motion compensation interpolation unit generates pixels to be interpolated by performing motion compensation in a frame and/or field to be interpolated using the motion vector estimated in the motion estimation unit, the spatiotemporal interpolation unit generates pixels to be interpolated as pixels neighboring the pixels to be interpolated in a frame and/or field neighboring a frame and/or field to be interpolated, the adaptive motion compensation unit outputs pixel values to be interpolated according to pixels generated in the motion compensation interpolation unit and the pixels generated in the spatiotemporal interpolation unit according to the motion information and correlation estimated in the motion analyzing unit.

BRIEF DESCRIPTION OF THE DRAWINGS

The above and other objects and advantages of the present invention will become more apparent and more readily appreciated by describing in detail embodiments thereof with reference to the accompanying drawings in which.

DESCRIPTION OF THE EMBODIMENTS

Figure 1:
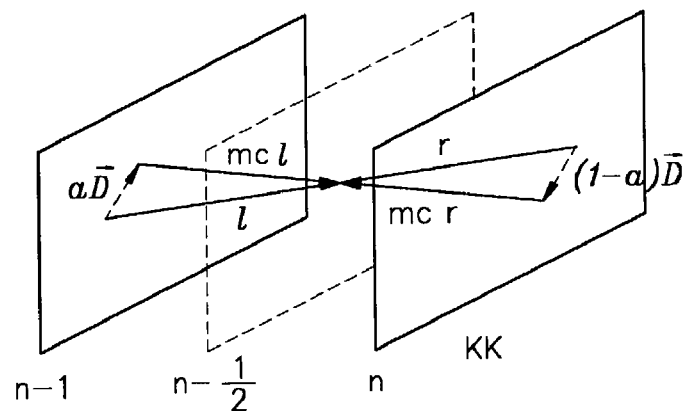
FIG. 1 is a conceptual diagram showing a method of converting a frame rate of an image signal using a conventional motion compensation method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
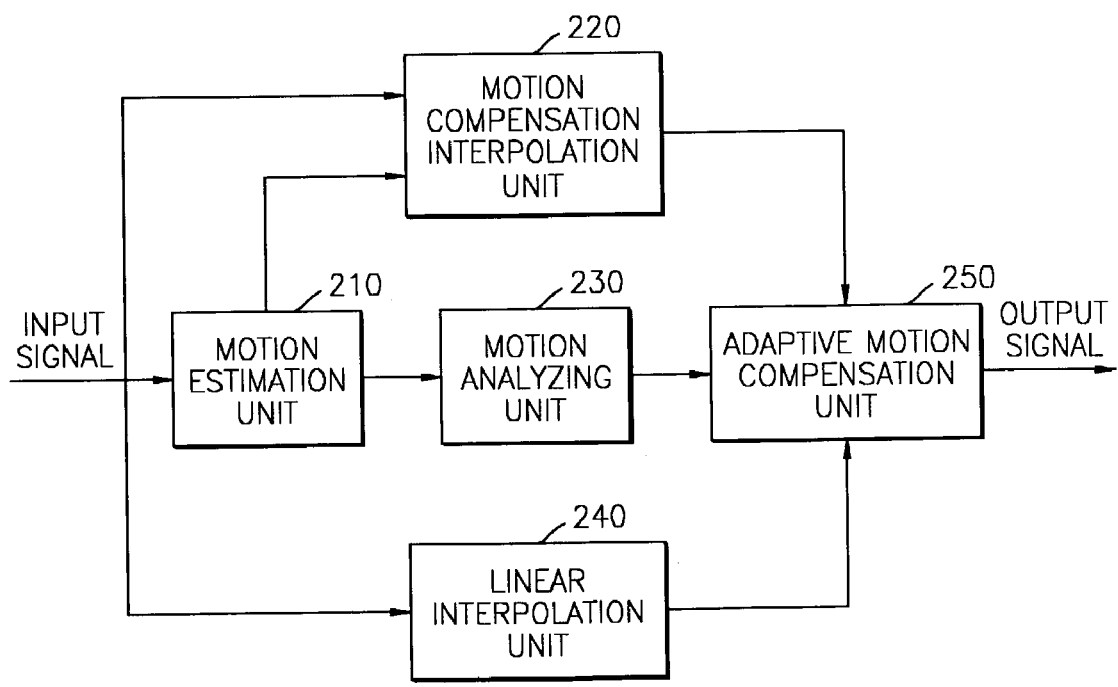
FIG. 2 is a block diagram of an apparatus for converting a frame rate of an image signal using adaptive motion compensation according to an embodiment of the present invention.
Figure 3:
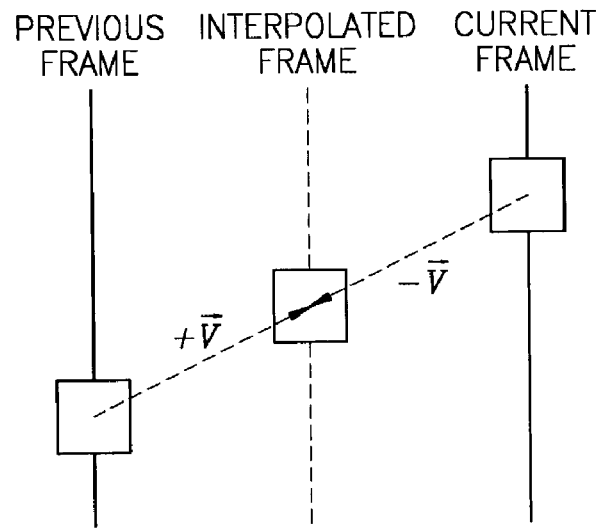
FIG. 3 is a conceptual diagram showing a process for compensating a motion using a motion vector estimated in a motion estimation unit of FIG. 2.

The apparatus for converting a frame rate using adaptive motion compensation according to the embodiment of the present invention shown in FIG. 2 has a motion estimation unit 210, a motion analyzing unit 230, a motion compensation interpolation unit 220, a linear interpolation unit 240, and an adaptive motion compensation unit 250. The motion estimation unit 210 estimates a motion vector of a frame/field to be interpolated and the accuracy of the motion vector using motion vectors between previous and next frames/fields. That is, block-based motion estimation is performed between two frames/fields that are continuously input. A current frame/field is divided into a plurality of blocks, each of which has a predetermined size. For each block, a difference from a predetermined search area in a previous frame/field is calculated, and the location of a block having the least difference is estimated as the motion vector of the current block. A frame/field to be interpolated is placed in the middle of two frames/fields that are continuously input. If a motion vector estimated from the frame/field to be interpolated is $\vec{V}$, motion compensation is performed as shown in FIG. 3. The accuracy of the motion vector is calculated using a value obtained by accumulating differences given by all pixels of the block.

The motion analyzing unit 230 determines the types of the motion by analyzing the motion vector estimated in the motion estimation unit 210. At the same time, the motion analyzing unit 230 calculates a correlation value between the motion vector of the current block and the motion vectors of neighboring blocks. At this time, this correlation value is used as a soft-switching value k. The soft-switching value k adjusts a weighted value according to the reliability of a motion vector by using an average value by motion compensation and a temporal average value.

Using the motion vector estimated in the motion estimation unit 210, the motion compensation interpolation unit 220 generates pixels to be interpolated by performing motion compensation in the interpolated frame. While not required in all embodiments, the motion compensation interpolation unit 220 compensates the motion of pixels of neighboring frames and/or fields by using the motion vector of a block containing the pixels of a frame and/or field to be interpolated, or compensates the motion of pixels of neighboring frames and/or fields by using the motion vector of a block neighboring a block containing the pixels of the frame and/or field to be interpolated.

The linear interpolation unit 240 generates pixels to be interpolated using pixels neighboring a pixel to be interpolated in the field to be interpolated and pixels neighboring a pixel to be interpolated in the previous and next fields of the pixel to be interpolated. At this time, the pixels of the frame/field to be interpolated are interpolated from corresponding pixels in neighboring frame/field.

The adaptive motion compensation unit 250 outputs the pixel as an interpolated value, generated by the motion compensation interpolation unit 220 and the linear interpolation unit 240 according to the accuracy of the motion vector estimated in the motion estimation unit 210 and motion information and the correlation value estimated in the motion analyzing unit 230.

Figure 4:
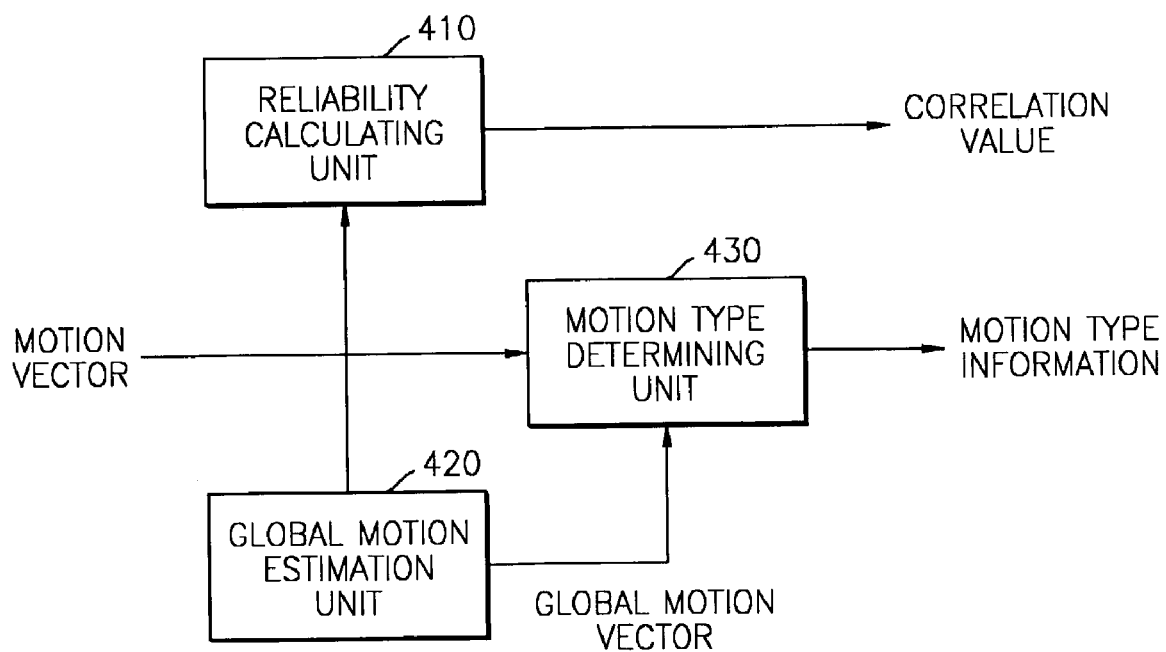
FIG. 4 is a detailed diagram of the motion analyzing unit of FIG. 3.

FIG. 4 is a detailed diagram of an embodiment of the motion analyzing unit 230. Referring to FIG. 4, the motion analyzing unit 230 has a global motion estimation unit 420, a motion type determining unit 430, and a reliability calculating unit 410 which calculates the reliability of the motion vector of the current block referring to correlation with neighboring motion vectors.

Figure 5:
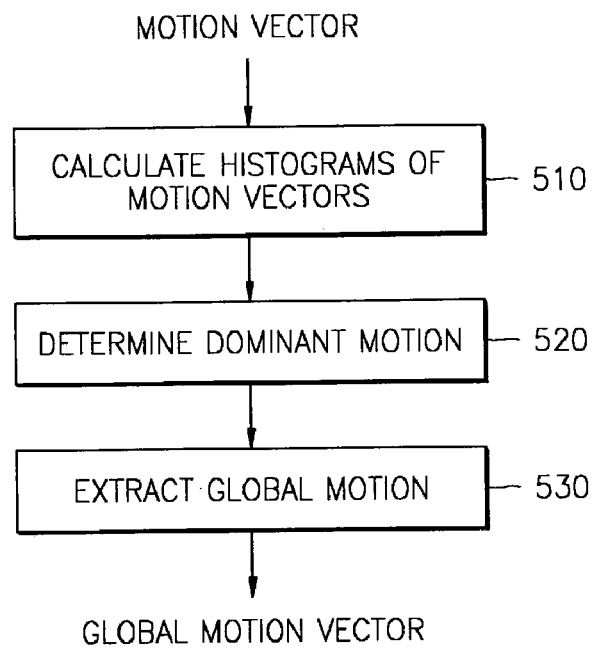
FIG. 5 is a detailed diagram of the global motion estimation unit of FIG. 4.

The global motion estimation unit 420 estimates a global motion by using a motion vector which is input, which will now be explained in more detail referring to FIG. 5. First, a motion vector is input and a histogram of the motion vector of each block is obtained in operation 510. Next, a dominant motion is determined in the histogram in operation 520, and is determined as a global motion vector in operation 530.

Here, assuming that the histograms in the horizontal direction and in the vertical direction are $h_x$ and $h_y$, respectively, a global motion is defined as in equations 3 and 4:

$$\text{global motion} = \begin{cases} \text{yes, if } I_x \neq 0 \text{ or } I_y \neq 0, \\ \text{no, otherwise} \end{cases} \quad (3)$$

where $I_x$ and $I_y$ are defined as follows:

$$I_x = \{k | k \in [-sr, sr], k \neq 0, h_x(k) > \epsilon_p(k)\}$$

$$I_y = \{k | k \in [-sr, sr], k \neq 0, h_y(k) > \epsilon_p(k)\}$$

where [−sr, sr] represents a search scope, while $\epsilon_p(k)$ is a threshold. Here, $V^g=(V_x^g, V_y^g)^T$ is as follows.

$$V_x^g = \arg\max_{k\in[-sr,sr]} h_x(k)$$

$$V_y^g = \arg\max_{k\in[-sr,sr]} h_y(k)$$

The motion type determining unit 430 determines a motion type by calculating a correlation using a global motion vector estimated by the global motion estimation unit 420 as in the following equation 4:

$$\text{motion type} = \begin{cases} \text{global, if } \|V - V^g\| < \epsilon_g, \\ \text{zero, if } V = 0, \\ \text{local, otherwise} \end{cases} \quad (4)$$

where $\epsilon_g$ is a threshold.

The reliability calculating unit 410 calculates the correlation between the motion vector of the current block and the motion vectors of neighboring blocks. The correlation is used as a soft switch value between pixels for motion compensation and pixels, whose motions are not considered. That is, the soft switch value is defined as presented in equation 5:

$$\text{soft switch} = \sum_{i=0}^{i=7} \|V_i - V\| \quad (5)$$

Figure 6:
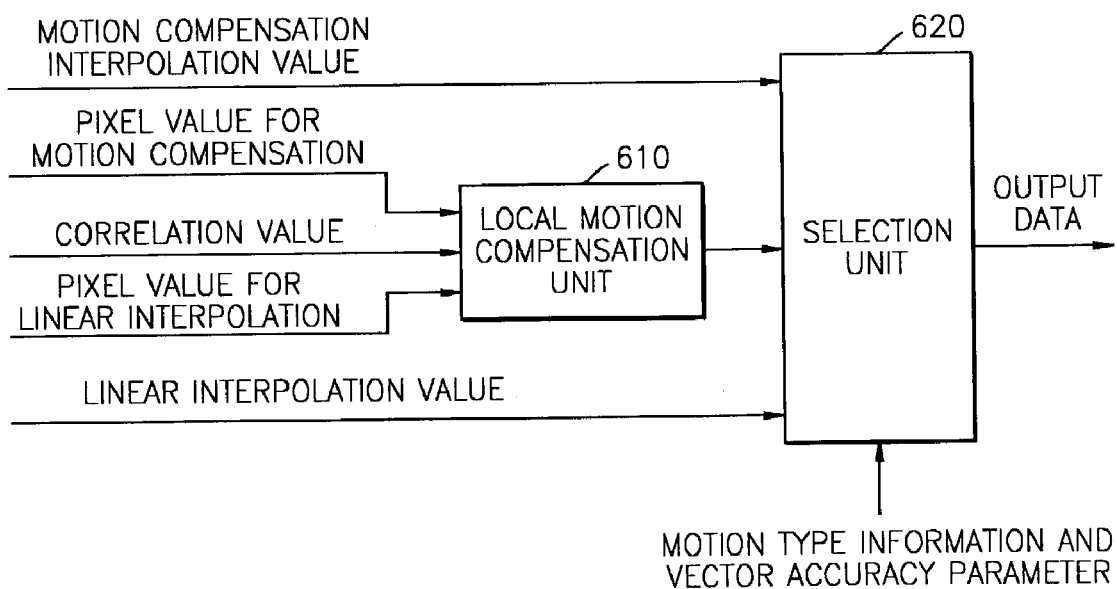
FIG. 6 is a detailed diagram of an adaptive motion compensation unit according to an embodiment of the invention.

FIG. 6 is a detailed diagram of an adaptive motion compensation unit 250. First, if the motion type information indicates a global motion, the selection unit 620 outputs a pixel value generated in the motion compensation interpolation unit 220 as presented in equation 6:

$$f_i(x) = \frac{1}{2}[f_{n-1}(x+V) + f_n(x-V)] \quad (6)$$

Here, V denotes the motion vector of the current block, and $f_i$, $f_{n-1}$, and $f_n$ denote a frame to be interpolated, the previous frame, and the current frame, respectively, where the previous frame and the current frame are continuously input. If the motion type information is a zero motion, the selection unit 620 outputs a pixel value generated in the linear interpolation unit 240 as presented in equation 7:

$$f_i(x) = \frac{1}{2}[f_{n-1}(x) + f_n(x)] \quad (7)$$

If the motion type information is a local motion, the selection unit 620 outputs a pixel value generated in the local motion compensation unit 610. The local motion compensation unit 610 adjusts the ratio of motion compensation pixels ($P_{mc}(x)$) and linear interpolation pixels ($P_{avg}(x)$) according to the correlation value (k). More specifically, the local motion compensation unit 610 receives motion compensation pixels and linear interpolation pixels, obtains motion compensation pixel values ($P_{mc}(x)$) and linear interpolation pixel values ($P_{avg}(x)$) by the following equations 8 through 10, and then using these pixel values, determines a final interpolation value ($f_i(x)$) as presented in equation 11.

$$f_i(x)=f_{n-1}(x+V_i),$$

$$r_i(x)=f_n(x-V_i), i=0,1,\ldots,N \quad (8)$$

Figure 7:
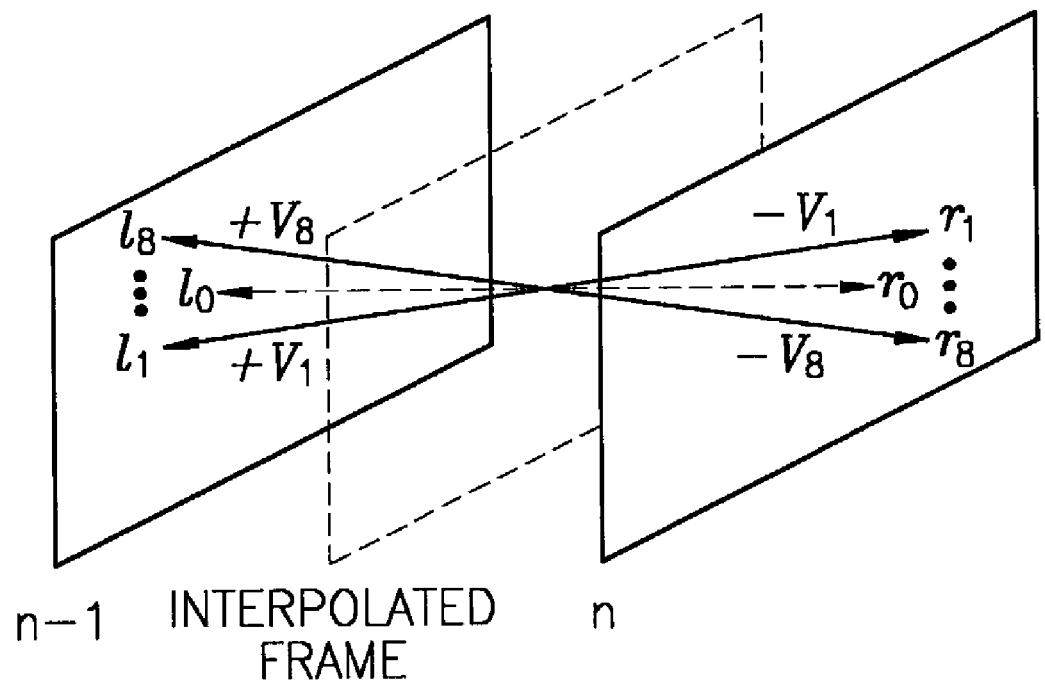
FIG. 7 is a conceptual diagram for motion compensation using motion vectors of a current frame/field block and neighboring frame/field blocks, used by the local motion compensation unit of FIG. 6.

Here, motion vector $V_i$ indicates the motion vector ($V_0$) of the current block and motion vectors ($V_1$–$V_8$) of neighboring blocks as shown in FIG. 7. Using the motion vectors of neighboring blocks, pixel sets to be used in motion compensation in the previous frame and the current frame are formed, and in each pixel set, a median value is obtained as presented in equation 9:

$$l_{med}(x)=\text{MEDIAN}\{l_i\},$$

$$r_{med}(x)=\text{MEDIAN}\{r_i\}, i=0,1,\ldots,N \quad (9)$$

These median values enable a smoothness effect of a motion vector to be obtained when the motion vector of the current block is not accurate. The motion vector to which the smoothness effect is applied is used for motion compensation pixels for soft-switching of a local motion.

$$p_{mc}(x)=\text{MEDIAN}\{l_{med}, r_{med}, (f_{n-1}(x)+f_n(x))/2\},$$

$$p_{avg}(x)=\text{MEDIAN}\{f_{n-1}(x), f_n(x), (l_{med}+r_{med})/2\} \quad (10)$$

Here, the correlation value (k) for soft-switching obtained in the reliability calculating unit 410 of FIG. 4 is determined as a value between $p_{mc}$ and $p_{avg}$. Therefore, the final interpolation pixel selected in the selection unit 620 is as presented in equation 11:

$$f_i(x)=k\cdot p_{avg}+(1-k)\cdot p_{mc} \quad (11)$$

Also, the selection unit 620 determines pixel values to be interpolated from the accuracy parameter estimated in the motion estimation unit 210 and the motion type. If it is determined that the motion type is a global motion, the interpolation value by motion compensation is output. If the motion type is a local motion, the soft-switching method which reduces block artifacts by using multiple motion trajectories is applied. Here, the threshold of a vector accuracy estimated according to a motion type is determined, and the motion type may change by comparing the estimated vector accuracy and a predetermined threshold. That is, even though the motion type is determined as a global motion, if the estimated vector accuracy is greater than the threshold, the global motion is changed into a local motion type.

As described above, according to the present invention, by applying different motion compensation methods according to motion information of each frame/field block, a higher quality picture can be obtained. Also, when an estimated motion vector may cause block artifacts, soft-switching is performed using correlation with motion vectors of neighboring blocks such that block artifacts can be reduced. Candidate vectors from motion vectors of neighboring blocks are used for defining interpolation pixels to be used in motion compensation such that a smoothness effect for motion vectors can be obtained at the same time.

While not specifically so described, it is understood that the apparatus performing the method can be implemented using a computer, where the method is encoded in a computer readable medium readable by the computer so as to implement the method.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of converting a frame and/or field rate of an input image signal, the method comprising:
    estimating a motion vector of a frame and/or field to be interpolated and an accuracy of the motion vector using motion vectors of previous and next frames and/or fields;
    determining motion information by analyzing the estimated motion vector estimated in the estimating the motion vector while calculating a correlation between a motion vector of a current block and motion vectors of neighboring blocks for the frame and/or field to be interpolated;
    generating first pixels to be interpolated by performing motion compensation in the frame and/or field to be interpolated using the estimated motion vector;
    generating second pixels to be interpolated using pixels neighboring a pixel to be interpolated in the frame and/or field to be interpolated and pixels neighboring the pixel to be interpolated in the previous and next frame and/or field of the pixel to be interpolated; and
    outputting pixels generated in the generating the first and second pixels to be interpolated as interpolation values according to an accuracy of the estimated motion vector and the determined motion information and the calculated correlation.

2. The method of claim 1, wherein the estimating the motion vector includes estimating the motion vector using a value obtained by accumulating the differences among all pixels in the current block.

3. The method of claim 1, wherein the determining the motion information in comprises:
    estimating a global motion vector in a current scene using a distribution of other estimated motion vectors of a plurality of frames and/or fields, each of the other estimated motion vectors being estimated as in the estimating the motion vector;
    determining motion information on current block containing the pixels of the frame and/or field to be interpolated by comparing the motion vector of the current block with a vector value of the estimated global motion vector; and
    calculating a correlation value by using a difference between the estimated motion vector of the current block and the other estimated motion vectors of neighboring blocks.

4. The method of claim 3, wherein the distribution of motion vectors is expressed by using a histogram.

5. The method of claim 3, wherein the global motion vector is estimated as a dominant value of a histogram in the horizontal direction of the motion vector, and a dominant value of a histogram in the vertical direction of the motion vector.

6. The method of claim 3, wherein the global motion vector is estimated by comparing the histogram value of the motion vector with a threshold.

7. The method of claim 3, wherein the determining the motion information comprises:
    comparing the motion vector of the current block with the estimated global motion vector to obtain a difference;
    if the difference is less than a predetermined threshold, setting the motion information of the current block as a global motion;
    if the difference is greater than the predetermined threshold, setting the motion information of the current block as a local motion; and
    if the difference is a zero vector, setting the motion information of the current block as a zero motion.

8. The method of claim 3, wherein the calculating the correlation value includes using a difference value between the motion vector of the current block and the motion vectors of neighboring blocks as a soft-switching value in motion compensation.

9. The method of claim 1, wherein the generating the first pixels to be interpolated by performing the motion compensation includes compensating the motions of the pixels of neighboring frames and/or fields using the motion vector of the current block containing the pixels of the frame and/or field to be interpolated.

10. The method of claim 1, wherein the generating the first pixels to be interpolated by performing the motion compensation includes compensating the motions of the pixels of neighboring frames and/or fields by using the motion vectors of blocks neighboring the current block containing the pixels of the frame and/or field to be interpolated.

11. The method of claim 1, wherein the generating the second pixels to be interpolated using neighboring pixels includes interpolating the pixels of the frame and/or field to be interpolated from the pixels in the neighboring frame/field corresponding to the pixels in the frame and/or field to be interpolated.

12. The method of claim 1, wherein the generating the first pixels to be interpolated includes interpolating the pixels of the frame and/or field to be interpolated using the neighboring pixels of the neighboring frames and/or fields.

13. The method of claim 1, wherein the outputting the pixels includes:
    if the motion type of the current block containing the pixels of the frame and/or field to be interpolated is a global motion and the estimated accuracy estimated in the estimating the motion vector is higher than a predetermined threshold, the first pixels obtained in the generating first pixels to be interpolated are selected as the pixels to be interpolated, and
    if the estimated accuracy estimated in the estimating the motion vector is lower than the predetermined threshold, the second pixels obtained in the generating the second pixels to be interpolated are selected as the pixels to be interpolated.

14. The method of claim 1, wherein the outputting the pixels includes, if the motion type of the current block containing the pixels of the frame and/or field to be interpolated is a local motion, performing interpolation from the first pixels generated in the generating the first pixels to be interpolated and the second pixels obtained in the generating the second pixels to be interpolated by soft-switching using a difference value of the motion vector of the current block and the motion vectors of the neighboring blocks.

15. The method of claim 14, wherein the interpolation by soft-switching includes assigning different weighted values to the first pixels generated in the generating the first pixels to be interpolated and the second pixels obtained in the generating the second pixels to be interpolated according to the difference value.

16. The method of claim 1, wherein the outputting the pixels includes interpolating using a first median value of the pixels of the previous frame and/or field and a second median value of the pixels of the next frame and/or field, based on the motion vector of the current block containing the pixels of the frame and/or field to be interpolated and the motion vectors of the neighboring blocks.

17. The method of claim 1, wherein the generating the first pixels to be interpolated includes generating the first pixels by using a first average value of the pixels of the previous frame and/or field and a second average value of the pixels of the next frame and/or field using the motion vector of the current block containing the pixels of the frame and/or field to be interpolated and the motion vectors of the neighboring blocks.

18. An apparatus which converts a frame and/or field rate of an image signal, comprising:
 a motion estimation unit which estimates a motion vector for a frame and/or field to be interpolated using motion vectors of previous and next frames and/or fields;
 a motion analyzing unit which determines motion information by analyzing the motion vector estimated in the motion estimation unit, and calculates a correlation between the motion vector of a current block and the motion vector of neighboring blocks;
 a motion compensation interpolation unit which generates first pixels to be interpolated by performing motion compensation in the frame and/or field to be interpolated using the estimated motion vector estimated in the motion estimation unit;
 a spatiotemporal interpolation unit which generates second pixels to be interpolated using pixels neighboring the pixels to be interpolated in the frame and/or field neighboring the frame and/or field to be interpolated; and
 an adaptive motion compensation unit which outputs, as pixel values to be interpolated, the first and second pixels generated in the motion compensation interpolation unit and the spatiotemporal interpolation unit according to the motion information and correlation estimated in the motion analyzing unit.

19. The apparatus of claim 18, wherein the motion analyzing unit comprises:
 a global motion estimation unit which estimates a global motion vector referring to a distribution of the estimated motion vectors;
 a motion type determining unit which determines the motion information of the current block by comparing the global motion vector estimated in the global motion estimation unit and the estimated motion vector; and
 a reliability calculating unit which adjusts weighted values of a motion compensation average value and a temporal average value by calculating the difference value of the motion vector of the current block and the motion vectors of neighboring blocks.

20. An apparatus which converts a frame and/or field rate of an image signal, comprising:
 a motion estimation unit which estimates a motion vector for a frame and/or field to be interpolated using motion vectors of previous and next frames and/or fields;
 a motion compensation interpolation unit which performs motion compensation in the frame and/or field to be interpolated using the estimated motion vector estimated in the motion estimation to generate first interpolated pixels;
 a spatiotemporal interpolation unit which uses pixels neighboring the pixels to be interpolated in the frame and/or field neighboring the frame and/or field to be interpolated to generate second interpolated pixels; and
 an adaptive motion compensation unit which receives the first and second interpolated pixels, uses the estimated motion vector to evaluate a type of motion for blocks in the frame/and or field to be interpolated which includes one block including the pixels to be interpolated, and selectively outputs alone or in combination the first and second interpolated pixels as pixel values for the pixels to be interpolated according to the evaluated type of motion.

21. The apparatus of claim 20, wherein, if the adaptive motion compensation unit determines the type of motion to be a first type of motion, the adaptive compensation unit adjusts a ratio of the first and second interpolated pixels to output the pixel values for the pixels to be interpolated.

22. The apparatus of claim 21, wherein if the type of motion is the first type of motion, the adaptive motion compensation unit determines a correlation between estimated motions for the one block and an adjacent one of the blocks in the frame and/or field to be interpolated, and adjusts the ratio of the first and second interpolated pixels according to a degree of the correlation.

23. The apparatus of claim 20, wherein, if the adaptive motion compensation unit determines the type of motion to be a first type of motion, the adaptive compensation unit outputs the first interpolated pixels alone to output the pixel values for the pixels to be interpolated.

24. The apparatus of claim 23, wherein if the type of motion is determined to be a second type of motion, the adaptive motion compensation unit determines a correlation between estimated motions for the one block and an adjacent one of the blocks in the frame and/or field to be interpolated, and adjusts a ratio of the first and second interpolated pixels according to a degree of the correlation to output the pixels values for the pixels to be interpolated.

25. The apparatus of claim 24, wherein if the type of motion is determined to be a third type of motion, the adaptive motion compensation unit outputs the second interpolated pixels as the pixel values for the pixels to be interpolated.

26. A computer readable medium encoded with processing instructions for implementing a method of converting a frame and/or field rate of an input image signal performed by a computer, the method comprising
 estimating a motion vector of a frame and/or field to be interpolated using motion vectors of previous and next frames and/or fields;
 determining motion information by analyzing the estimated motion vector;
 generating first interpolated pixels by performing motion compensation in the frame and/or field to be interpolated using the estimated motion vector;
 generating second interpolated pixels using pixels neighboring a pixel to be interpolated in the frame and/or field to be interpolated and pixels neighboring the pixel to be interpolated in the previous and next frame and/or field of the pixel to be interpolated; and
 evaluating a type of motion for blocks in the frame/and or field to be interpolated which includes a current block including the pixels to be interpolated using the determined motion information; and
 selectively outputting alone or in combination the first and second interpolated pixels as pixel values for the pixels to be interpolated according to the evaluated type of motion.

27. The computer readable medium of claim 26, wherein the evaluating the type of motion comprises:
   estimating a global motion vector in a current scene using a distribution of other estimated motion vectors of a plurality of frames and/or fields, each of the other estimated motion vectors being estimated as in the estimating the motion vector;
   determining the motion type on the current block containing the pixels of the frame and/or field to be interpolated by comparing the estimated motion vector of the current block with a vector value of the estimated global motion vector; and
   calculating a correlation value by using a difference between the estimated motion vector of the current block and the estimated motion vectors of neighboring blocks.

28. The computer readable medium of claim 27, wherein a distribution of the estimated motion vectors is expressed by using a histogram.

29. The computer readable medium of claim 27, wherein the determining the motion type comprises:
   comparing the estimated motion vector of the current block with the estimated global motion vector to obtain a difference;
   if the difference is less than a predetermined threshold, setting the motion type of the current block as a global motion;
   if the difference is greater than the predetermined threshold, setting the motion type of the current block as a local motion; and
   if the difference is a zero vector, setting the motion type of the current block as a zero motion.

30. The computer readable medium of claim 26, wherein the selectively outputting comprises, if the evaluated type of motion is a first type of motion, adjusting a ratio of the first and second interpolated pixels to be output as the pixels to be interpolated.

31. The computer readable medium of claim 30, wherein the adjusting the ratio comprises determining a correlation between the estimated motions of the current block with the estimated motions of adjacent blocks, and adjusting the ratio according to a degree of the correlation.

32. The computer readable medium of claim 30, wherein if the evaluated type of motion is a second type of motion, the selectively outputting comprises outputting the first interpolated pixels as the pixels to be interpolated.

33. The computer readable medium of claim 32, wherein if the evaluated type of motion is a third type of motion, the selectively outputting comprises outputting the second interpolated pixels as the pixels to be interpolated.

* * * * *

UNITED STATES PATENT AND TRADEMARK OFFICE
CERTIFICATE OF CORRECTION

PATENT NO. : 7,075,988 B2
APPLICATION NO. : 10/277093
DATED : July 11, 2006
INVENTOR(S) : Sung-hee Lee et al.

It is certified that error appears in the above-identified patent and that said Letters Patent is hereby corrected as shown below:

Column 10, Line 45, after "comprising" insert --:--.

Signed and Sealed this

Thirtieth Day of January, 2007

JON W. DUDAS
*Director of the United States Patent and Trademark Office*